United States Patent
Yu

(10) Patent No.: US 8,894,085 B2
(45) Date of Patent: Nov. 25, 2014

(54) SHOCK-ABSORBING SEAT STAY FOR BICYCLE

(71) Applicant: Yuan Min An Enterprise Co., Ltd., Taichung (TW)

(72) Inventor: Kuo-Pin Yu, Taichung (TW)

(73) Assignee: Yuan Min An Enterprise Co., Ltd., Taichung (TW)

( * ) Notice: Subject to any disclaimer, the term of this patent is extended or adjusted under 35 U.S.C. 154(b) by 0 days.

(21) Appl. No.: 13/864,042

(22) Filed: Apr. 16, 2013

(65) Prior Publication Data
US 2014/0159337 A1 Jun. 12, 2014

(30) Foreign Application Priority Data
Dec. 6, 2012 (TW) .............................. 101223688 A

(51) Int. Cl.
B62J 1/08 (2006.01)
B62K 25/04 (2006.01)
B62K 19/16 (2006.01)

(52) U.S. Cl.
CPC . *B62J 1/08* (2013.01); *B62K 25/04* (2013.01); *B62K 19/16* (2013.01); *B62K 2201/02* (2013.01)
USPC .......................................... 280/283; 280/278

(58) Field of Classification Search
CPC ......... B62K 19/24; B62K 19/30; B62K 21/08
USPC .............. 280/275, 281.1, 283, 284, 285, 288; 180/27
See application file for complete search history.

(56) References Cited

U.S. PATENT DOCUMENTS

| | | | | |
|---|---|---|---|---|
| 5,797,613 | A * | 8/1998 | Busby | 280/284 |
| 7,063,343 | B1 * | 6/2006 | Chen | 280/276 |
| 2011/0248469 | A1 * | 10/2011 | Chubbuck et al. | 280/276 |

* cited by examiner

*Primary Examiner* — Joseph M Rocca
*Assistant Examiner* — Jacob Knutson
(74) *Attorney, Agent, or Firm* — Muncy, Geissler, Olds & Lowe, P.C.

(57) ABSTRACT

A shock-absorbing seat stay for a bicycle includes a seat tube coupler having two branches each having a first joint portion, two extended parts each having a second joint portion corresponding to one of the first joint portions, two shock-absorption members made of elastic materials and each held between the corresponsive first and second joint portions, and at least two fastener units. Each of the first joint portions has at least one first through hole. Each of the second joint portions has at least one second through hole. Each of the shock-absorption members includes at least one third through hole. Each of the at least two fastener units is mounted to one set of the at least one first, second, and third through holes to further interconnect the corresponsive first joint portion, second joint portion, and shock-absorption member.

10 Claims, 5 Drawing Sheets

SHOCK-ABSORBING SEAT STAY FOR BICYCLE

BACKGROUND OF THE INVENTION

1. Field of the Invention

The present invention relates generally to a shock-absorption structure for a bicycle and more particularly, to a shock absorbing seat stay for a bicycle.

2. Description of the Related Art

When people ride bicycles to pass through the rugged road surface, they can perceive obvious vibration and feel uncomfortable, so shock absorbers are usually mounted to the bicycle frames for shock absorption. However, such shock absorber usually includes a metallic spring or is shock-absorbent pneumatically or hydraulically, so it is structurally complicated and heavy and the user's pedaling force is partially absorbed by the shock absorber to reduce the dynamic transmission rate. For this reason, the conventional shock absorber is not a good choice for a road bike of which lightweight and high-speed running are characteristic. On the other hand, the road bicycle without any shock absorber tends to make the user feel increasingly tired, so the user frequently faces the dilemma whether to choose a road bicycle having lightweight and high dynamic transmission rate properties or comfortableness.

SUMMARY OF THE INVENTION

The primary objective of the present invention is to provide a shock-absorbing seat stay for a bicycle, which is lightweight and high in both dynamic transmission rate and shock absorption for a seat stay of a bicycle.

The foregoing objective of the present invention is attained by the shock-absorbing seat stay, which is adapted for connection with a seat tube of a bicycle. The shock-absorbing seat stay includes a seat tube coupler, two extended parts, two shock-absorption members, and at least two fastener units. The seat tube coupler is made of a fiber reinforced material and includes a coupling portion and two branches. The coupling portion has a first end for connection with the seat tube of the bicycle, and a second end from which the two branches integrally extend outward. Each of the two branches includes a first joint portion. Each of the first joint portions has at least one first through hole. The two extended parts are made of fiber reinforced materials and each include a second joint portion corresponding to one of the first joint portions. Each of the second joint portions has at least one second through hole. The two shock-absorption members are made of elastic materials and each are held between the corresponsive first and second joint portions. Each of the shock-absorption members includes at least one third through hole. Each of the at least two fastener units is mounted to one set of the at least one first, second, and third through holes to further interconnect the corresponsive first joint portion, second joint portion, and shock-absorption member. Each of the at least two fastener units includes a screw bolt and a screw nut.

The shock-absorption members made of the elastic materials are mounted between the first joint portions of the seat tube coupler and the second joint portions of the extended parts for providing the bicycle with appropriate shock absorption. Compared with the conventional shock absorber, the present invention is more lightweight and not subject to reduction of dynamic transmission rate, so the present invention is a balanced solution to the user's multidimensional needs.

DETAILED DESCRIPTION OF PREFERRED EMBODIMENTS

Structural features and desired effects of the present invention will become more fully understood by reference to two preferred embodiments given hereunder. However, it is to be understood that these embodiments are given by way of illustration only, thus are not limitative of the claim scope of the present invention.

Figure 1:
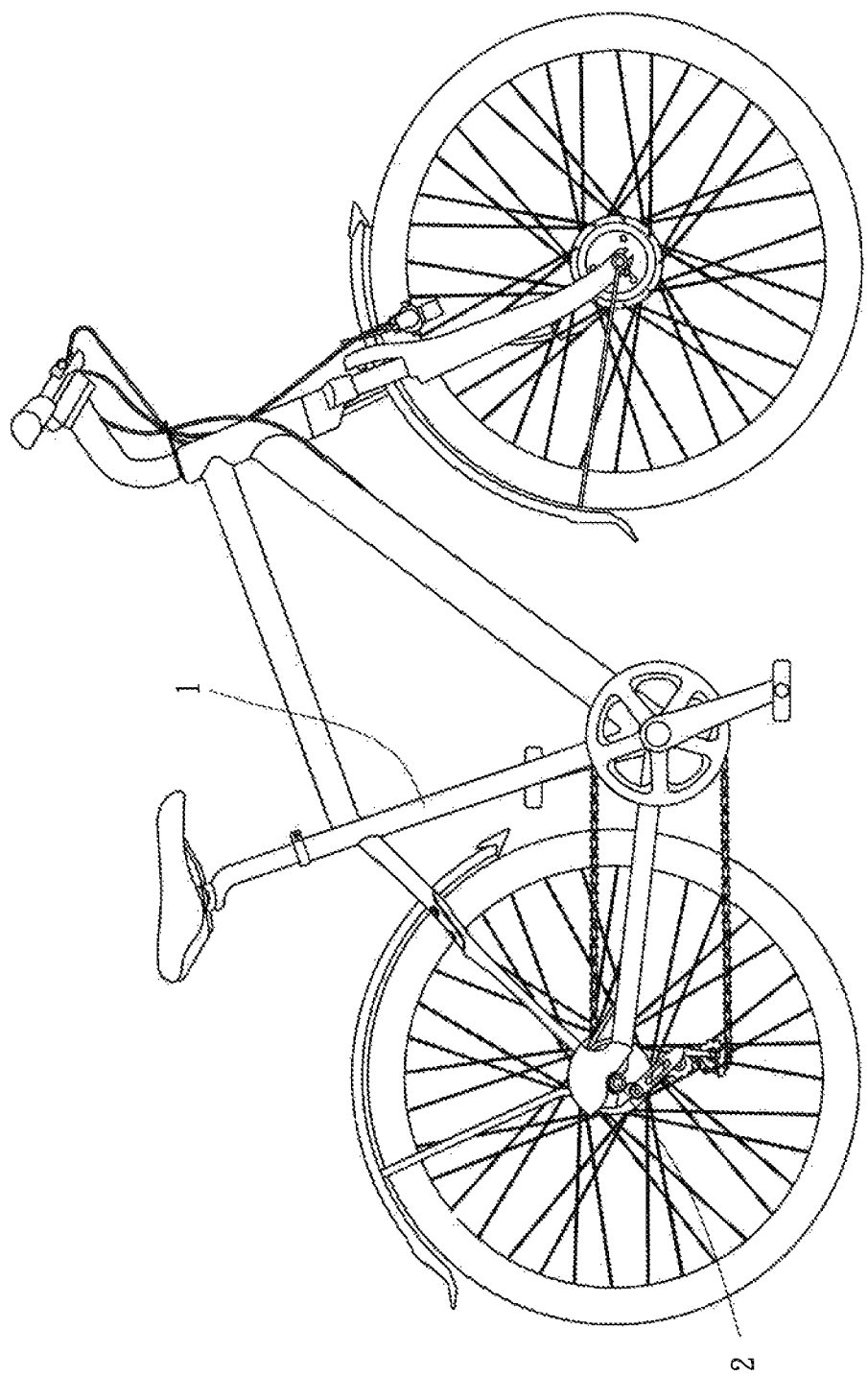
FIG. 1 is a schematic view of a first preferred embodiment of the present invention applied to a bicycle.
Figure 2:
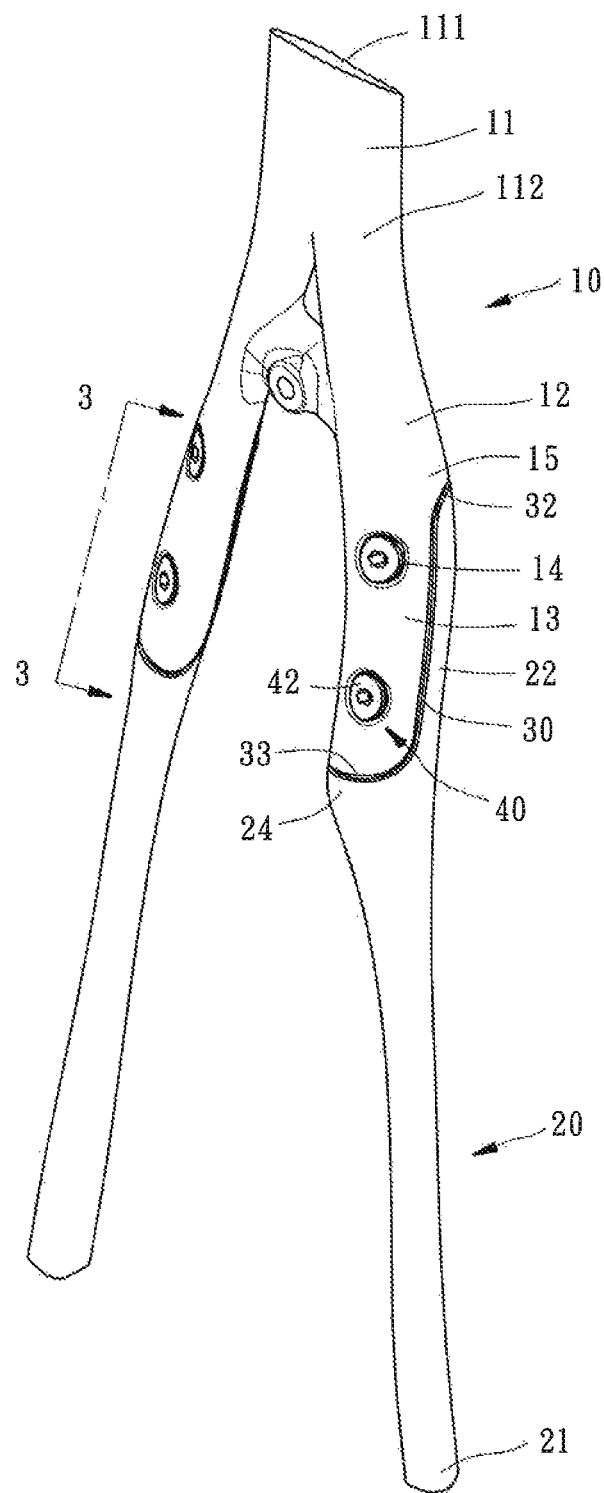
FIG. 2 is a perspective view of the first preferred embodiment of the present invention.
Figure 3:
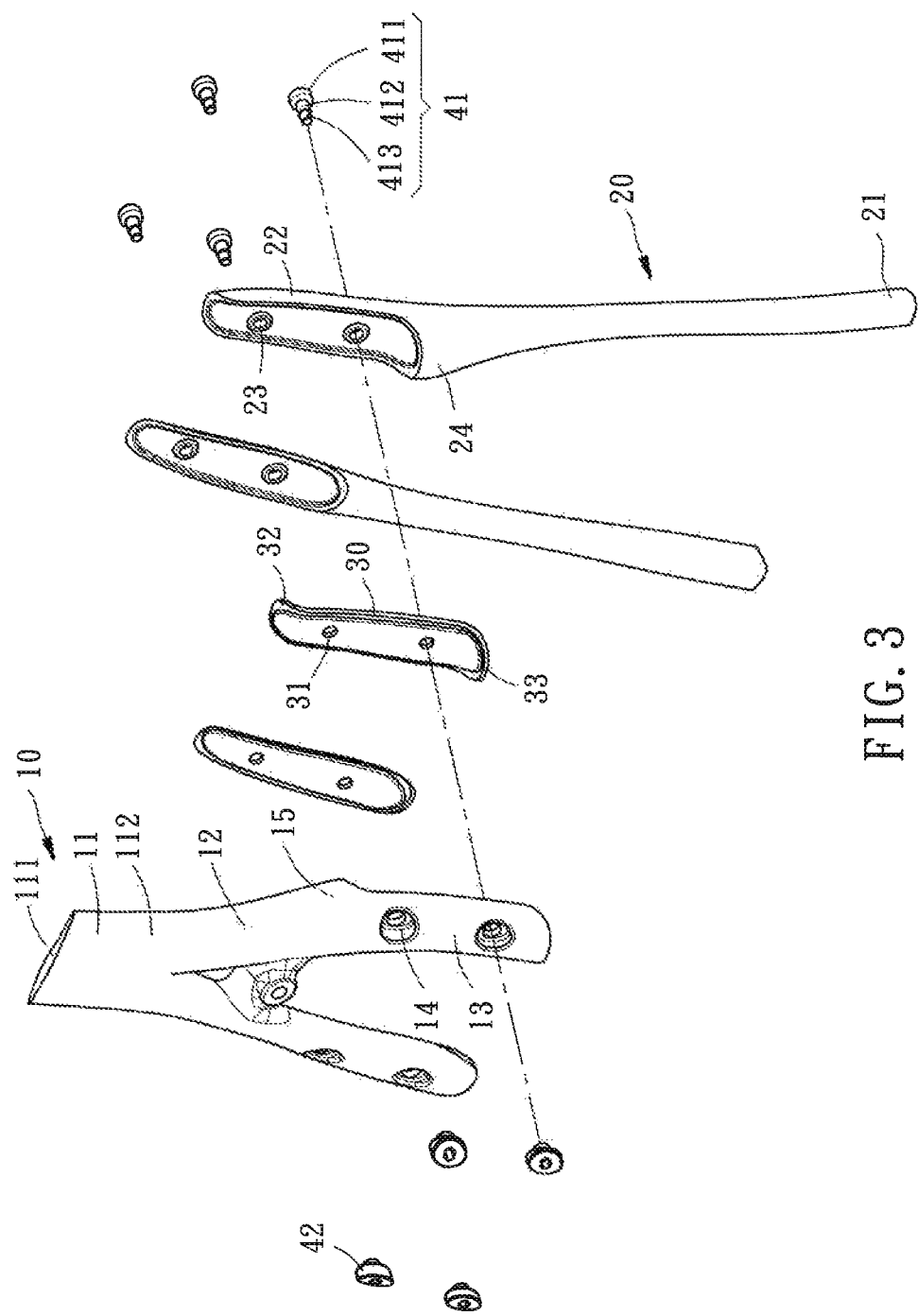
FIG. 3 is an exploded view of the first preferred embodiment of the present invention.
Figure 4:
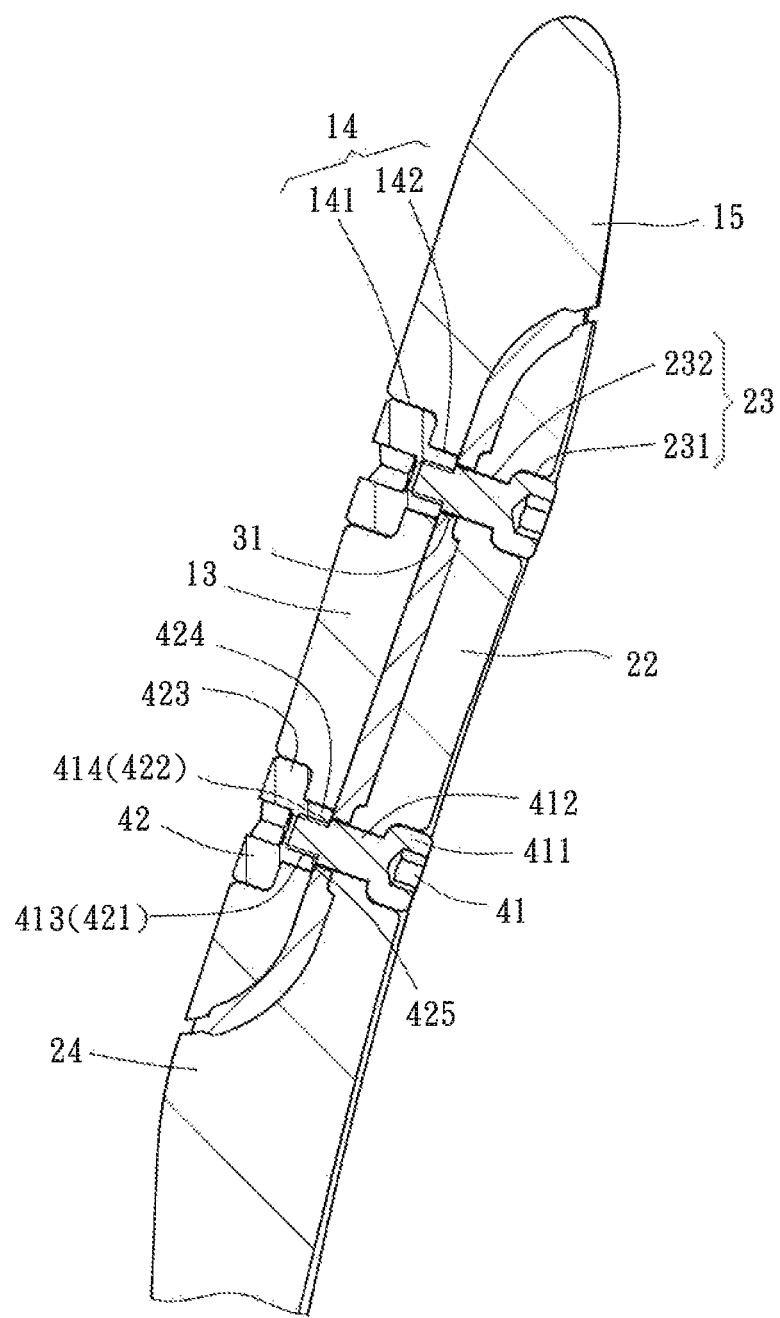
FIG. 4 is a partially sectional view of the first preferred embodiment of the present invention.

Referring to FIG. 1, a shock-absorbing seat stay for a bicycle in accordance with a first preferred embodiment of the present invention is adapted for connection between a seat tube 1 and a rear wheel axle 2 of the bicycle. Referring to FIGS. 2-4, the shock-absorbing seat stay includes a seat tube coupler 10, two extended parts 20, two shock-absorption members 30, and a plurality of fastener units 40.

The seat tube coupler 10 is made of a fiber reinforced material, which can be but not limited to carbon fiber reinforced plastic, glass fiber reinforced plastic, or Kevlar fiber reinforced plastic where the plastic can be thermoplastic, thermosetting plastic, or a composite of both. The seat tube coupler 10 includes a coupling portion 11 and two branches 12. The coupling portion 11 has a first end 111 for connection with the seat tube 1 of the bicycle, and a second end 112 from which the two branches 12 integrally extend outwardly. Each of the two branches 12 has a first joint portion 13. Each of the first joint portions 13 has two first through holes 14.

The two extended parts 20 are made of fiber reinforced materials and each include a wheel-axle coupling end 21 extending toward the rear wheel axle 2 of the bicycle and a second joint portion 22 corresponding to the first joint portion 13. A rear wheel axle supporting structure can be provided at the wheel-axle coupling end 21 for supporting the rear wheel axle 2. The rear wheel axle supporting structure is made of a material that is not limited to the fiber reinforced material. Each of the second joint portions 22 has two second through holes 23.

The two shock-absorption members 30 are made of elastic materials, which can be but not limited to isobutylene isoprene rubber (IIR), silicone rubber, thermoplastic rubber (TPR), or thermoplastic polyurethane (TPU) and each are held between the corresponsive first joint portion 13 and second joint portion 22. Each of the shock-absorption members 30 includes two third through holes 31. The numbers of the first, second, and third through holes 14, 23, 31 can correspond to one another and each are at least one.

Each of the fastener units 40 is mounted to one set of the first, second, and third through holes 14, 23, 31 substantially vertically relative to the extended parts 20 to interconnect the corresponsive first joint portion 13, second joint portion 22, and shock-absorption member 30. Each of the fastener units 40 includes a screw bolt 41 and a screw nut 42. Each of the screw bolts 41 is inserted into the second and third through holes 23 and 31 to be screwed with the screw nut 42 mounted to the first through hole 14.

To prevent the first and second joint portions 13, 22 from excessively clamping oppression and making elastic fatigue or shock-absorption reduction of the shock-absorption member 30, the first and second joint portions 13, 22 can keep a proper interval therebetween. For this reason, each of the screw bolts 41 includes a head portion 411, a body portion 412, and an external thread section 413. The body portion 412 is located between the head portion 411 and the external thread section 413 and has a larger contour than that of the external thread section 413 to form a first stopping surface 414 facing the screw nut 42. Each of the screw nuts 42 includes a second stopping surface 422 for abutment against the first stopping surface 414, and a threaded hole 421 recessed inwardly from the second stopping surface 422 for threaded connection with the external thread section 413. Furthermore, each of the screw nuts 42 can similarly include a head portion 423 and a body portion 424 extending outwardly from the head portion 423. The second stopping surface 422 is located at a free end 425 of the body portion 424. In this way, when the first and second stopping surfaces 414 and 422 abut against each other, the user is prohibited from further tightening the screw bolt 41 and the screw nut 42 to protect the shock members 30 from excessive oppression for proper buffer space. To prevent the head portions 411, 423 of the screw bolts 41 and the screw nuts 42 from protrusion from the seat stay, a large-diameter portion 141 (231) and a small-diameter portion 142 (232) are formed in each of the first and second through holes 14, 23 for receiving the head portion 411 (423) of the screw bolt 41 or the screw nut 42 and for receiving the body portions 412 (424) of the screw bolt 41 or the screw nut 42, respectively. It is noticed that the positions of the screw bolt 41 and the screw nut 42 are interchangeable, or the large-diameter portion and the small-diameter portion are formed in only one of the first and second through holes 14, 23, or none of the large-diameter portion and the small-diameter portion is formed in any of the first and second through holes 14, 23. To prevent the screw nut 42 from rotation along with the screw bolt 41 while the screw bolt 41 is screwed into the screw nut 42, the contour of the screw nut 42 or the head portion 423 of the screw nut 42 can be designed to be shaped like an ellipse or other shape that is not circular. The first through hole 14 or the second through hole 23 can be designed to correspond to the head portion 423 in shape.

The shock-absorption structure of the present invention can effectively absorb the vibration from the rear wheel of the bicycle to provide buffer effect in directions that are vertical and parallel to an imaginary longitudinal axis of the seat stay. Under the circumstances, each of the first joint portions 13 can further include a front stopping edge 15 protruding downward and located in front of the first through hole 14, and each of the second joint portions 22 can further include a rear stopping edge 24 protruding upward and located behind the second through hole 23. The front and rear stopping edges 15, 24 abut against the front and rear ends of the two shock-absorption members 30 to fulfill the shock absorption in parallel direction. Preferably, each of the shock-absorption members 30 can further include a front curved portion 32 curved downwardly and located at the front end thereof and a rear curved portion 33 curved upwardly and located at the rear end thereof to make the front and rear stopping edges 15, 24 abut against the front and rear curved portions 32, 33 of the two shock-absorption members 30, respectively.

Figure 5:
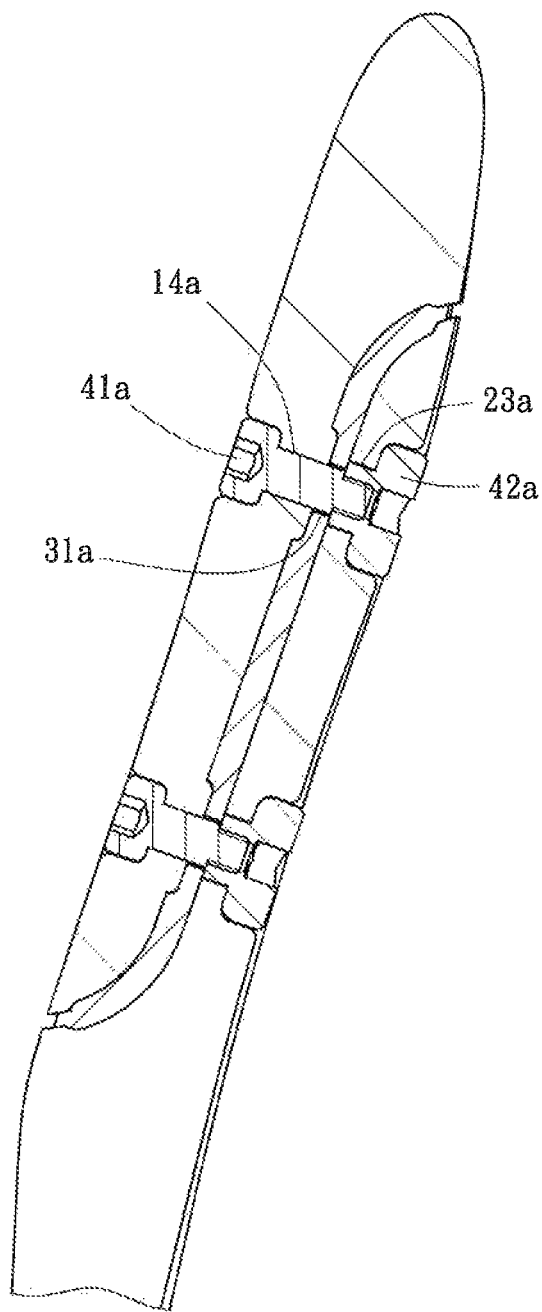
FIG. 5 is a partially sectional view of a second preferred embodiment of the present invention.

In this embodiment, the screw bolt 41 of each fastener unit 40 is inserted through the second and third through holes 23, 31 in order and the screw nut 42 of the same is mounted into the first through hole 14. On the other hands, the screw nut 42 and the screw bolt 41 of each fastener unit 40 can be reversely mounted as shown in FIG. 5, in which the screw bolt 41a is inserted through the first and third through holes 14a, 31a in order to be screwed with the screw nut 42a mounted to the second through hole 23a. It is worth mentioning that the screw bolt and the screw nut are not limited to the aforesaid patterns. For example, the screw nut may only have the head portion without the body portion.

In conclusion, the shock-absorption members made of the elastic material and held between the seat tube coupler and the extended parts can provide proper buffer effect to lower the perception of fatigue of the bicycle rider while the rigidity of the bicycle frame will not be excessively reduced to lose the treadling dynamic energy. Besides, the shock-absorption members are much lightweight than the conventional ones to fully conform to the trend toward lightweight bicycle to further satisfy the users' multidimensional needs.

What is claimed is:

1. A shock-absorbing seat stay for connection with a seat tube of a bicycle, the shock-absorbing seat stay comprising:
   a seat tube coupler made of fiber reinforced material and having a coupling portion and two branches, the coupling portion having a first end and a second end, the first end being adapted for connection with the seat tube of the bicycle, the two branches integrally extending from the second end and each having a first joint portion, each of the first joint portions having at least one first through hole;
   two extended parts made of fiber reinforced material and each having a second joint portion corresponding to one of the first joint portions, each of the second joint portions having at least one second through hole;
   two shock-absorption members made of elastic material and held between the corresponsive first and second joint portions, each of the shock-absorption members having at least one third through hole, each of the first through holes being in alignment with one of the second through holes and one of the third through holes; and
   at least two fastener units each inserted through one of the first through holes, the corresponsive second through hole and the corresponsive third through hole to interconnect the corresponsive first joint portion, second joint portion, and shock-absorption member, each of the at least two fastener units having a screw bolt and a screw nut.

2. The shock-absorbing seat stay as defined in claim 1, wherein each of the shock-absorption members is made of isobutylene isoprene rubber, silicone rubber, thermoplastic rubber, or thermoplastic polyurethane.

3. The shock-absorbing seat stay as defined in claim 1, wherein each of the screw bolts comprises a head portion, a body portion, and an external thread section, the body portion being located between the head portion and the external thread section, the body portion having a contour larger than that of the external thread section to form a first stopping surface between the body portion and the external thread section; each of the screw nuts comprising a second stopping surface for abutment against the first stopping surface, and a screw hole recessed inwardly from the second stopping surface and screwed with the external thread section.

4. The shock-absorbing seat stay as defined in claim 3, wherein each of the screw nuts comprises a head portion and a body portion extending outwardly from the head portion, the body portion of the screw nut having a free end, the second stopping surface being located at the free end.

5. The shock-absorbing seat stay as defined in claim 4, wherein the at least one first through hole comprises a large-diameter portion for receiving the head portion of one of the screw bolt and the screw nut, and a small-diameter portion for receiving the body portion of said one of the screw bolt and the screw nut.

6. The shock-absorbing seat stay as defined in claim 5, wherein the at least one second through hole comprises a large-diameter portion for receiving the head portion of the other one of the screw bolt and the screw nut, and a small-diameter portion for receiving the body portion of said the other one of the screw bolt and the screw nut.

7. The shock-absorbing seat stay as defined in claim 4, wherein the at least one second through hole comprises a large-diameter portion for receiving the head portion of one of the screw bolt and the screw nut, and a small-diameter portion for receiving the body portion of said one of the screw bolt and the screw nut.

8. The shock-absorbing seat stay as defined in claim 4, wherein each of the screw nut comprises a noncircular contour.

9. The shock-absorbing seat stay as defined in claim 1, wherein each of the first joint portions comprises a front stopping edge protruding downwardly and located in front of the at least one first through hole; each of the second joint portions comprises a rear stopping edge protruding upwardly and located behind the at least one second through hole, the front stopping edges abutting against respective front ends of the shock-absorption members, the rear stopping edges abutting against respective rear ends of the shock-absorption members.

10. The shock-absorbing seat stay as defined in claim 9, wherein each of the shock-absorption members comprises a front curved portion curved downwardly and located at the front end of the shock-absorption member, and a rear curved portion curved upwardly and located at the rear end of the shock-absorption member, the front stopping edges abutting against the respective front curved portions of the shock-absorption members, the rear stopping edges abutting against the respective rear curved portions of the shock-absorption members.

\* \* \* \* \*